(12) United States Patent
Hans et al.

(10) Patent No.: US 7,551,932 B2
(45) Date of Patent: Jun. 23, 2009

(54) METHOD OF ASSIGNING TRANSMISSION CHANNELS IN A TELECOMMUNICATIONS NETWORK AND USER STATION

(75) Inventors: Martin Hans, Hildesheim (DE); Frank Kowalewski, Salzgitter (DE); Josef Laumen, Hildesheim (DE); Gunnar Schmidt, Wolfenbuettel (DE); Detlef Lechner, Berlin-Tempelhof (DE); Siegfried Baer, Pforzheim (DE); Mark Beckmann, Hameln (DE)

(73) Assignee: Ipcom GmbH & Co. KG, Pullach (DE)

( * ) Notice: Subject to any disclaimer, the term of this patent is extended or adjusted under 35 U.S.C. 154(b) by 289 days.

(21) Appl. No.: 10/705,523

(22) Filed: Nov. 10, 2003

(65) Prior Publication Data

US 2005/0037766 A1  Feb. 17, 2005

(51) Int. Cl.
*H04W 72/00* (2009.01)

(52) U.S. Cl. .................. 455/465; 455/464; 455/450; 455/434; 455/161.3

(58) Field of Classification Search ................ 455/464, 455/452.1, 452.2, 63, 62.11, 63.13, 161.3, 455/185.1, 465, 450, 434
See application file for complete search history.

(56) References Cited

U.S. PATENT DOCUMENTS

| | | | | |
|---|---|---|---|---|
| 5,093,924 | A * | 3/1992 | Toshiyuki et al. | ........... 455/450 |
| 5,212,831 | A * | 5/1993 | Chuang et al. | ............... 455/450 |
| 6,052,594 | A * | 4/2000 | Chuang et al. | ............... 455/450 |
| 6,442,151 | B1 * | 8/2002 | H'mimy et al. | ............. 370/333 |
| 6,574,456 | B2 * | 6/2003 | Hamabe | ..................... 455/63.3 |
| 2001/0046867 | A1 * | 11/2001 | Mizoguchi | ................... 455/452 |
| 2004/0214582 | A1 * | 10/2004 | Lan et al. | .................. 455/452.2 |

FOREIGN PATENT DOCUMENTS

EP  0 865 172  9/1998

* cited by examiner

*Primary Examiner*—Nick Corsaro
*Assistant Examiner*—Dung Lam
(74) *Attorney, Agent, or Firm*—Kenyon & Kenyon LLP (57) ABSTRACT

A method of assigning transmission channels in a telecommunications network and a user station are provided, which facilitate an increase in the capacity of a telecommunications network. The telecommunications network may include multiple base stations and mobile stations, the transmission channels being provided for transmitting signals between the base stations and the mobile stations. In uncoordinated operation of the base stations, at least one of the transmission channels is assigned for transmitting signals between one of the base stations and one of the mobile stations as a function of a channel measurement, in which the transmission power on all possible transmission channels is measured, if the previously measured transmission power on this transmission channel is minimal.

7 Claims, 4 Drawing Sheets

METHOD OF ASSIGNING TRANSMISSION CHANNELS IN A TELECOMMUNICATIONS NETWORK AND USER STATION

FIELD OF THE INVENTION

The present invention relates to a method of assigning transmission channels in a telecommunications network and to a user station.

BACKGROUND INFORMATION

A method and a device for operation in an indoor CDMR telecommunications system are referred to in European published patent application Ser. No. 0 865 172, in which two or more wireless communications systems are operated superimposed. One of the two systems is an indoor system and the other is an outdoor system. The indoor system monitors the operation of the outdoor system and detects which part of the available radio resources are sometimes not used or are interference-free in the outdoor system. The indoor system dynamically selects an unused outdoor channel for indoor operation. The indoor radio traffic is divided into TDD time slots, which include the time slots for monitoring the existing radio connections on other outdoor channels, so that rapid changes are possible in accordance with changing traffic and changing interference conditions. A threshold value comparison is performed during the selection of the channels.

In mobile radio systems of the third generation, for example in accordance with the GSM standard (Global System for Mobile Communications) or the UMTS standard (Universal Mobile Telecommunication System) or the like, two concepts (or modes) may be provided for transmitting signals via an air interface between a base station and a mobile station, depending on the transmission resource used. If various frequency bands are provided as a transmission resource, an FDD mode (Frequency Division Duplex) may be used, in which two different frequency bands are used to transmit the signals from the mobile station to the base station in the uplink transmission direction and from the base station to the mobile station in the downlink transmission direction. If time slots are used as a transmission resource, the TDD mode (Time Division Duplex) may be used, in which different time slots are used for the uplink transmission direction and the downlink transmission direction, while using the same frequency band. Further channel separation is possible for both modes in this case.

However, in uncoordinated operation the base stations may not be linked via a higher-order system, so that coordinated code assignment may not be possible. Such operation may be advisable, for example, for the home sector with cordless telephones, in which, under certain circumstances, many individual base stations may be operated independently from one another. In this case, the code assignment may not be coordinated. Therefore, only one base station may be active per transmission resource, for example, per time slot or per frequency band, but even using multiple different codes for this purpose. This transmission resource may be occupied for a neighboring base station; since the station may not know the codes used. A power measurement may permit the neighboring base station to detect whether a transmission resource is occupied. If so, the neighboring base station may substitute other transmission resources, for example, other time slots or frequency bands.

SUMMARY OF THE INVENTION

It is believed that an exemplary method according to the present invention for assigning transmission channels in a telecommunications network and an exemplary user station according to the present invention may have the advantage in that, in uncoordinated operation of base stations, at least one of the transmission channels is assigned for transmitting signals between one of the base stations and one of the mobile stations as a function of a channel measurement. To perform the channel measurement, the transmission power on all possible transmission channels is measured, if the previously measured transmission power on the transmission channel is minimal. In this manner, the existing transmission channels may be optimally distributed on connections set up or to be set up for transmitting signals between the base stations and the mobile stations, so that the capacity of the telecommunications network, and therefore the number of connections to be set up simultaneously, may be increased, or at least maximized. The same transmission channel may even be used simultaneously by various base stations if, for example, due to a limited range, the various base stations influence one another insignificantly or not at all.

It may be advantageous that codes are provided, through which at least one transmission resource, for example, a time slot or a frequency band, is spread using multiple transmission channels for transmitting signals between the base stations and the mobile station, and that the channel measurement includes a code measurement, in which a received signal for each transmission resource is despread using each allowed code to measure the transmission power of each of the transmission channels. In this manner, a transmission resource, for example, a time slot or a frequency band, may be used jointly and simultaneously by different base stations and/or by multiple transmission channels. Through the division of the transmission resources, the capacity of the telecommunications network, and therefore the number of connections capable of being set up simultaneously, may be increased.

It is believed to be advantageous in that the channel measurement for the assignment of at least one of the transmission channels between one of the base stations and one of the mobile stations is performed while a connection is being established. In this manner, the capacity of the telecommunications network is used at the earliest possible time for every connection to be set up.

It is also believed to be advantageous that the channel measurement for the assignment of at least one of the transmission channels is performed during an existing connection between one of the base stations and one of the mobile stations, that the connection quality of the existing connection is measured in parallel, and, if the connection quality falls below a preselected value, that a channel change is performed and at least one new transmission channel is assigned as a function of the channel measurement of the existing connection. In this manner, dynamic channel assignment may be implemented for one or more existing connections, so that the transmission channels previously assigned to an existing connection have the highest possible connection quality.

In addition, it is believed to be advantageous that, for at least one of the base stations, specific information is transmitted via a broadcast channel to all mobile stations in the reception range of the at least one base station, and that the broadcast channel is changed if the interference detected thereon exceeds a preselected value. In this manner, the broadcast channel may be dynamically assigned to at least one of the base stations, the broadcast channel previously used receiving as little interference as possible.

It is believed that a further advantage is that at least one of the transmission channels is reserved for use as a broadcast channel. In this manner, the expense and time required for the mobile stations to find the broadcast channel is reduced, since the stations may find the broadcast channel from an already selected or preselected set of transmission channels.

It is also believed to be advantageous in that, if the transmission capacity of the established transmission channels is insufficient, at least one transmission channel scrambled using a new scrambling code is assigned for transmitting signals between one of the base stations and one of the mobile stations as a function of a channel measurement, in which the transmission power on all possible transmission channels is measured after scrambling, using a scrambling code, if the transmission power measured on the scrambled transmission channel is minimal. In this manner, it may be avoided that a base station in uncoordinated operation cannot find a free transmission channel because, for example, one or more other base stations already occupy all of the transmission channels. Rather, the number of transmission channels and therefore the data rate may be further increased by using scrambling codes.

DETAILED DESCRIPTION

Figure 1:
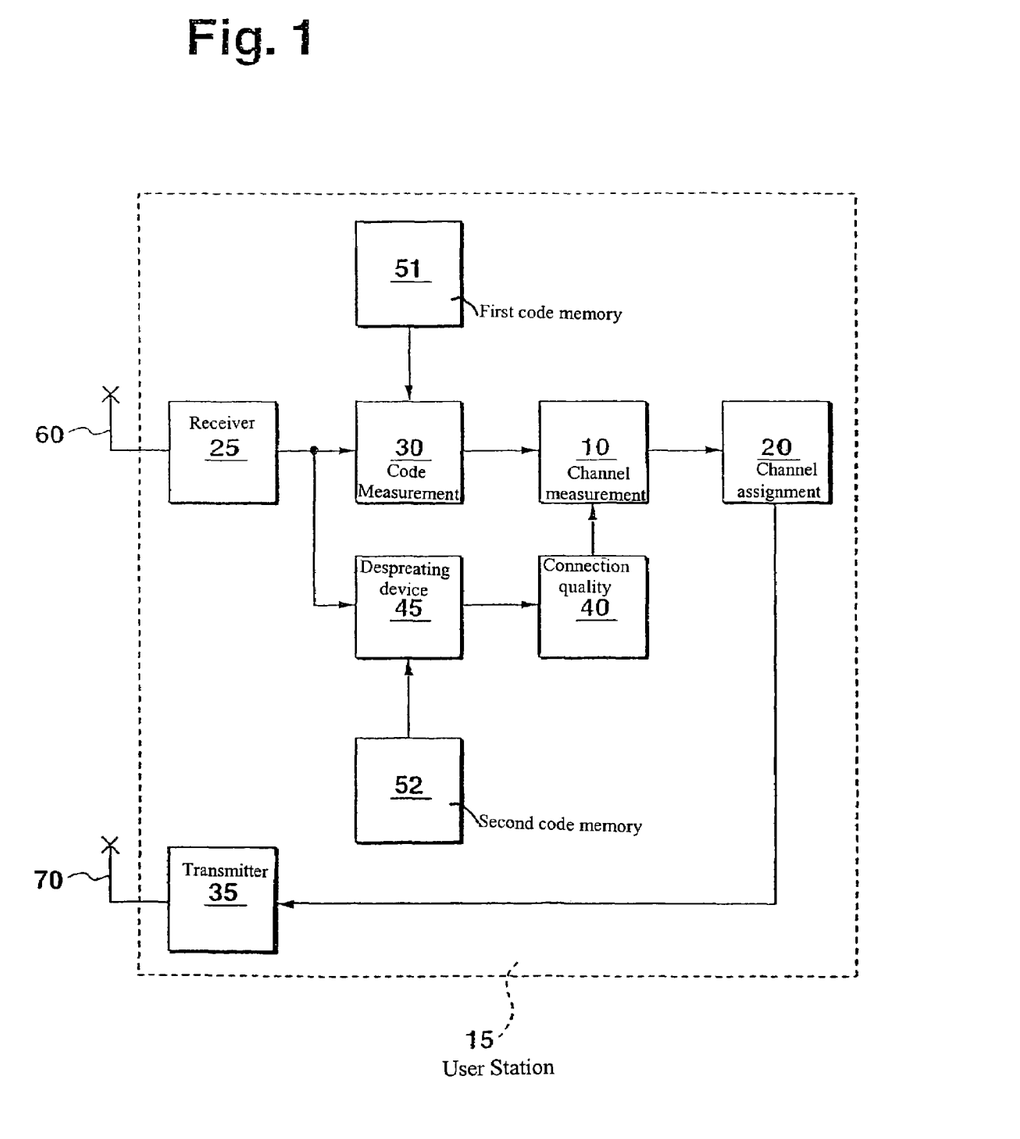
FIG. 1 is a block diagram of an exemplary user station according to the present invention.

In FIG. 1, 15 identifies a user station of a telecommunications network 5. Telecommunications network 5 may be implemented, for example, as a landline network or as a mobile radio network. If telecommunications network 5 is a mobile radio network, user station 15 may include a base station 11, 12 or a mobile station 21, 22, as shown, for example, in FIG. 3. For the description to follow, it is presumed, for exemplary purposes only, that telecommunications network 5 is a mobile radio network and that user station 15 is a base station 11, 12 or a mobile station 21, 22. Mobile radio system 5 and user station 15 may be implemented, for example, according to the GSM standard (Global System for Mobile Communication), the UMTS standard (Universal Mobile Telecommunication System) or the like.

User station 15 illustrated in FIG. 1 includes a receiver 25, to which a receiving aerial 60 is connected. As shown in FIG. 1, user station 15 also includes a transmitter 35, to which a transmitting aerial 70 is connected. Receiving aerial 60 and transmitting aerial 70 may also be combined into a combined transmitting/receiving aerial by using a multiplexer, for example. Receiver 25 is connected on the output side to an input of code measurement arrangement 30 for code measurement and is also connected to an input of a despreading device 45. Codes of a first code memory 51 are also supplied to code measurement arrangement 30 for code measurement. In addition, at least one code of a second code memory 52 is supplied to despreading device 45. Code measurement arrangement 30 for code measurement is connected on the output side to an input of channel measurement arrangement 10 for channel measurement. Despreading device 45 is connected on the output side to an input of a connection quality arrangement 40 for measuring the connection quality. An output of connection quality arrangement 40 is also supplied to channel measurement arrangement 10. Channel measurement arrangement 10 is connected on the output side to an input of a channel assignment arrangement 20 for channel assignment, the output of which is supplied to transmitter 35.

Figure 3:
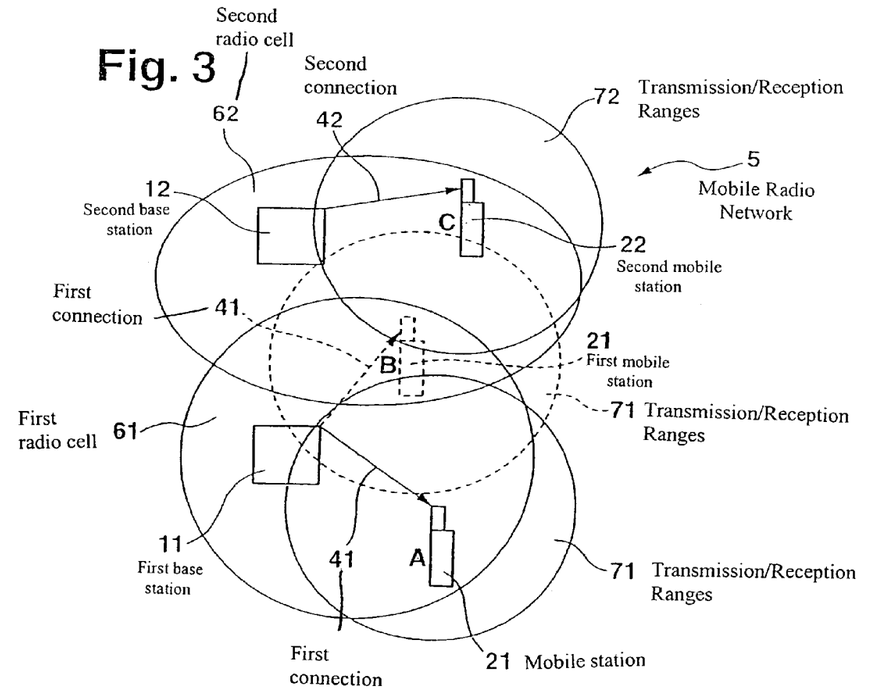
FIG. 3 is a diagram showing an exemplary first arrangement of base and mobile stations in a mobile radio network according to the present invention.

In the following description, for exemplary purposes only, both first base station 11 and second base station 12 in mobile radio network 5 as shown in FIG. 3 are constructed similarly to the user station 15 shown in FIG. 1, and both first mobile station 21 and second mobile station 22 are constructed similarly to user station 15 shown in FIG. 1. As shown in FIG. 3, first base station 11 covers a first radio cell 61, in which the first base station 11 may communicate with mobile stations using radio signals. Second base station 12 covers a second radio cell 62, in which the second base station 11 may communicate with mobile stations using its radio signals. First mobile station 21 is positioned in first radio cell 61, while second mobile station 22 is positioned in second radio cell 62. A first connection 41 is to be established between first base station 11 and first mobile station 21, while a second connection 42 is to be established between second base station 12 and second mobile station 22.

Figure 2:
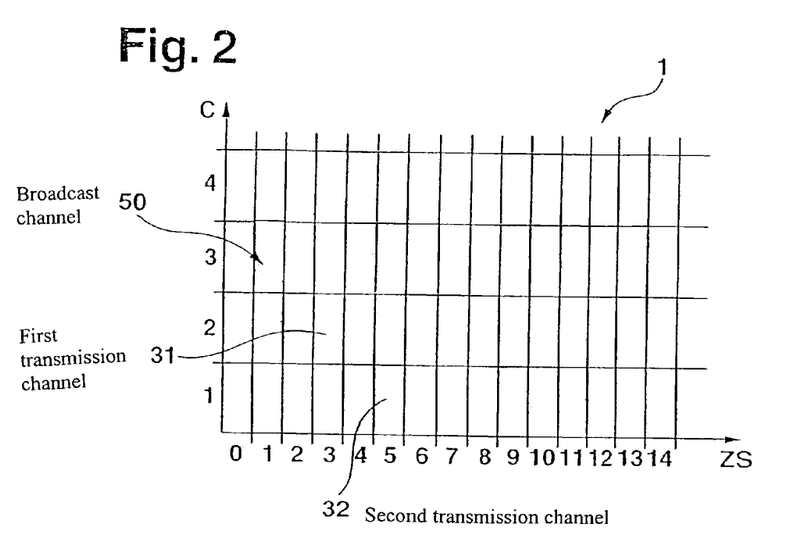
FIG. 2 is a code-time slot diagram.

Two different concepts (or modes) may be provided for first connection 41 and for second connection 42: FDD mode (Frequency Division Duplex), in which two different frequency bands are used as a transmission resource for the uplink transmission direction from respective mobile stations 21, 22 to assigned base stations 11, 12; and TDD mode (Time Division Duplex), in which different time slots in the same frequency band are used as a transmission resource for the uplink transmission direction and the downlink transmission direction. In both modes, the respective transmission resources may be spread into multiple transmission channels by using codes C based, for example, on a CDMA method (Code Division Multiple Access) for further channel separation. In this case, one frequency band or one time slot may each be spread into multiple transmission channels by using different codes. One such transmission resource, for example, one time slot or one frequency band, may be used simultaneously by various connections and/or by the same connection in the uplink or in the downlink transmission direction by using different codes, so that the capacity of mobile radio network 5 and/or the number of connections which may be set up in mobile radio network 5 may be increased by increasing the number of usable transmission channels. If, for example, the transmission resources are implemented as time slot ZS, spreading into multiple transmission channels by using different codes C is illustrated in FIG. 2. In this case, fifteen time slots are provided per transmission frame on the abscissa numbered from 0 to 14 in FIG. 2. Four different codes C from 1 to 4 are plotted on the ordinate, so that each time slot ZS is spread into four different transmission channels, which differ from one another due to different coding, using the same spread factor 4. The transmission channels created in this manner are illustrated as raster elements in the code-time slot diagram shown in FIG. 2 and are indicated, as a whole, using reference number 1.

For example, time slots for transmitting signals in mobile radio network 5 may be used as a transmission resource. In this case, base stations 11, 12 are operated uncoordinatedly and are not connected via a higher order system, so that coordinated code assignment may not be possible. Such uncoordinated operation may be used for the home sector when using mobile stations 21, 22 implemented as cordless telephones, since many individual base stations may be, under certain circumstances, operated independently from one another and therefore uncoordinatedly. For a cordless telephony application, telecommunications network 5, base stations 11, 12, and mobile stations 21, 22 may be implemented, for example, in accordance with the DECT standard (Digital European Cordless Telecommunications). In such uncoordinated operation, coordinated code assignment for the individual connections to be set up between base stations 11, 12 and mobile stations 21, 22 may no longer be possible.

Below, first connection 41 to be set up between first base station 11 and first mobile station 21 is described for exemplary purposes only. While the connection is being established, code measurement arrangement 30 checks, either in first base station 11 or in first mobile station 21, which codes C in which time slots ZS are already occupied by other connections. For this purpose, the signal for each of fifteen time slots ZS received in first base station 11 and/or first mobile station 21 should be despread using each permitted code C stored in first code memory 51, corresponding to CDMA demodulation. Through despreading in code measurement arrangement 30, all transmission channels 1, each of which are implemented as a code/time slot combination, are extracted from the received signal. As shown in FIG. 2, sixty transmission channels result from the multiplication of fifteen time slots ZS by four codes C. Extracted transmission channels 1 are then supplied to channel measurement arrangement 10, which measures the transmission power on all extracted transmission channels 1. First connection 41 to be set up is then assigned to at least one of transmission channels 1 by channel assignment arrangement 20. In this case, the transmission channel with a minimal previously measured transmission power is assigned to first connection 41. For a full duplex connection to be set up between first base station 11 and first mobile station 21, the exemplary method according to the present invention is to be performed both for the uplink transmission direction from first mobile station 21 to first base station 11 and for the downlink transmission direction from first base station 11 to first mobile station 21, so that at least one transmission channel may be used for first connection 41 in each of the two transmission directions. FIG. 3 illustrates the downlink transmission direction with arrows for both first connection 41 and for second connection 42. In this case, the channel measurement for assigning at least one of transmission channels 1 may be performed in the uplink transmission direction by first base station 11 and the channel measurement for assigning at least one of transmission channels 1 may be performed in the downlink transmission direction by first mobile station 21. The assignment of the at least one of transmission channels 1 selected through the channel measurement in the uplink transmission direction may then be performed by first base station 11. The assignment is performed by its channel assignment arrangement 20, which, via transmitter 35 of first base station 11, transmits a corresponding signal to first mobile station 21 in regard to the at least one assigned transmission channel. In a corresponding manner, the assignment of at least one of transmission channels 1 in the downlink transmission direction may be performed by first mobile station 21, the channel assignment arrangement 20 of which transmits a signal to first base station 11 via corresponding transmitter 35 so that first base station 11 may know the at least one transmission channel selected for the downlink transmission direction.

According to this exemplary embodiment of the present invention, a first transmission channel 31, which represents a combination of the third time slot and the second code shown in the code/time slot diagram of FIG. 2, is assigned for the downlink transmission direction of first connection 41.

Before establishing first connection 41, first base station 11 initially selects one of transmission channels 1 and uses it as a broadcast channel. According to this exemplary embodiment of the present invention, base station 1 first selects a combination of first time slot and third code, as shown in the code/time slot diagram of FIG. 2, as broadcast channel 50. The specific information for first base station 11 is transmitted via broadcast channel 50 to all mobile stations located in first radio cell 61. This specific information may contain, for example, the codes used by first base station 11, an identification of first base station 11, synchronization information, information about transmission channels and/or code/time slot combinations already used, information about paging messages that exist for one or more of the mobile stations located in first radio cell 61, etc. First mobile station 21 located in first radio cell 61 may therefore recognize first base station 11 assigned to it by synchronization on broadcast channel 50 and analysis of the information transmitted via this broadcast channel 50.

Each of transmission channels 1 may be used as broadcast channel 50. To avoid interference of the broadcast channels of different base stations 11, 12, the broadcast channel may be changed if needed, for example, if interference from other broadcast channels or transmission channels detected on the broadcast channel exceeds a preselected value. To reduce the outlay of first mobile station 21 and to find broadcast channel 50, either a special code C may be reserved and/or preselected for any desired time slot ZS or a specific time slot ZS may be reserved and/or preselected for any desired code C for the broadcast channel of first base station 11, or a prereserved selection of any desired specified transmission channels and/or code/time slot combinations may be used as a broadcast channel 50.

During existing first connection 41, the transmission power is cyclically remeasured on all possible transmission channels 1, so that a picture of free and occupied and/or of malfunctioning and functioning transmission channels is continuously available. In parallel, the connection quality of existing first connection 41 is measured by connection quality arrangement 40 in first base station 11 and/or in first mobile station 21, for example, on the basis of the transmission error rate. If the connection quality falls below a preselected value, a channel change to another transmission channel and/or another code/time slot combination may be performed. For this purpose, the transmission powers of the transmission channels and/or code/time slot combinations previously not used for first connection 41 should be continuously monitored. For the channel change, first base station 11 measures the connection quality of first connection 41 in the uplink transmission direction and first mobile station 21 measures the corresponding connection quality of first connection 41 in the downlink transmission direction. If the connection quality falls below a preselected threshold, the channel changes in the uplink and downlink transmission directions occur independently from one another. For this purpose, the establishment of the connection may be accomplished in three manners. In the first manner, the channel change is performed solely by base station 11, since it already knows all of the transmission channels it uses. For this purpose, first mobile station 21 transmits, via its transmitter 35, the measurement results of the connection quality or the request for a channel change due to such measurement results for the downlink transmission direction to first base station 11. In the second manner, mobile station 21 first initiates the channel change in the downlink transmission direction and first base station 11 initiates the channel change in the uplink transmission direction. The third manner is oriented to the DECT standard, in which the channel change is initiated by first mobile station 21 both in the uplink and in the downlink transmission directions, and first base station 11 merely signals to first mobile station 21 that a channel change is necessary in the uplink transmission direction. Regardless of whether the connection quality is measured in first base station 11 or in first mobile station 21, this measurement is performed in that the transmission channels to be evaluated for first connection 41 are extracted from the signal received via corresponding receiver 25 by respective despreading device 45 with the aid of the code(s) assigned to first connection 41, which is/are stored in second code memory 52, and supplied to connection quality arrangement 40. In connection quality arrangement 40, the connection quality of the transmission channels for first connection 41 may then be, for example, measured on the basis of the transmission error rate. In parallel, code measurement arrangement 30 extracts all transmission channels 1 from the signal received via receiver 25 with the aid of the codes stored in first code memory 51 and supplies these transmission channels to the channel measurement in first channel measurement arrangement 10, which measures the transmission power on extracted transmission channels 1. Channel measurement arrangement 10 checks, with reference to the value of the connection quality of the respective transmission channel of first connection 41 determined by connection quality arrangement 40, whether this value falls below a preselected value for the connection quality. If so, channel measurement arrangement 10 selects the transmission channel that has the minimum transmission power and causes channel assignment arrangement 20 to subsequently use this transmission channel for first connection 41 instead of the corresponding transmission channel measured by connection quality arrangement 40, which has too low a connection quality.

FIG. 3 illustrates first base station 11 and second base station 12 operated independently from one another. One mobile station 21, 22 is registered in each of two base stations 11, 12. First mobile station 21 is initially located at a first position A within first radio cell 61, illustrated in FIG. 3, and has a first transmission/reception range 71. Second mobile station 22 is located at a third position C in second radio cell 62 and includes a second transmission/reception range 72. First mobile station 21 may transmit and receive radio signals within first transmission/reception range 71. Signals transmitted outside the first transmission/reception range 71 may no longer be received by first mobile station 21. In addition, signals transmitted by first mobile station 21 outside first transmission/reception range 71 may no longer be received in second base station 12 and in second mobile station 22. The same is true for second transmission/reception range 72 of second mobile station 22. In this case, the same transmission channels and/or code/time slot combinations are simultaneously used in the uplink and in the downlink transmission directions for both first connection 41 and second connection 42. As shown in FIGS. 2 and 3, first transmission channel 31 is used for the downlink transmission direction for both first connection 41 and second connection 42. If a channel change occurs, it applies for both the uplink and the downlink transmission directions, both being independent from one another. Both mobile stations 21, 22 are sufficiently distant from one another so that their transmission/reception ranges 71, 72 do not overlap and do not mutually interfere in their transmission channels. The instantaneous transmission quality is measured for both connections 41, 42 in the manner described above, both in the uplink and in the downlink transmission directions, for example, by analyzing the transmission or bit error rates. Both mobile stations 21, 22 cyclically establish the transmission power of all possible transmission channels 1 and/or code/time slot combinations, by despreading all transmission channels 1 and/or code/time slot combinations in the way described above via code measurement arrangement 30 and establishing the transmission power on transmission channels 1 extracted in this way via channel measurement arrangement 10 and storing this transmission power in tabular form in a memory (not shown in FIG. 1). Smaller values of the transmission power measured signal little or no interference in this case. If first mobile station 21 now moves from first position A into second position B and therefore, as shown in FIG. 3, into second radio cell 62 and/or into second transmission/reception range 72 of second mobile station 22, the mutual interference of the transmission channels used increases and the connection quality is therefore reduced. If it falls below the preselected value for the connection quality, then a channel change is initiated in the way described above for at least one of the two connections 41, 42 and this connection is assigned at least one new transmission channel in the uplink and/or in the downlink transmission direction.

In a modification of the exemplary embodiment described with reference to FIG. 2, despreading individual time slots ZS by more or less than four codes C may also be provided.

According to this exemplary embodiment of the present invention, however, all fifteen time slots ZS per transmission frame are spread using four codes C, so that a total of 60 transmission channels results. Both first base station 11 and second base station 12 may thus access 60 such transmission channels if there is no interference, so that a total of 60 connections may theoretically be established simultaneously within the geographical range defined by first radio cell 61 and by second radio cell 62, if the reservation of transmission channels for setting up a broadcast channel for each of the two base stations 11, 12 is not considered.

Figure 4:
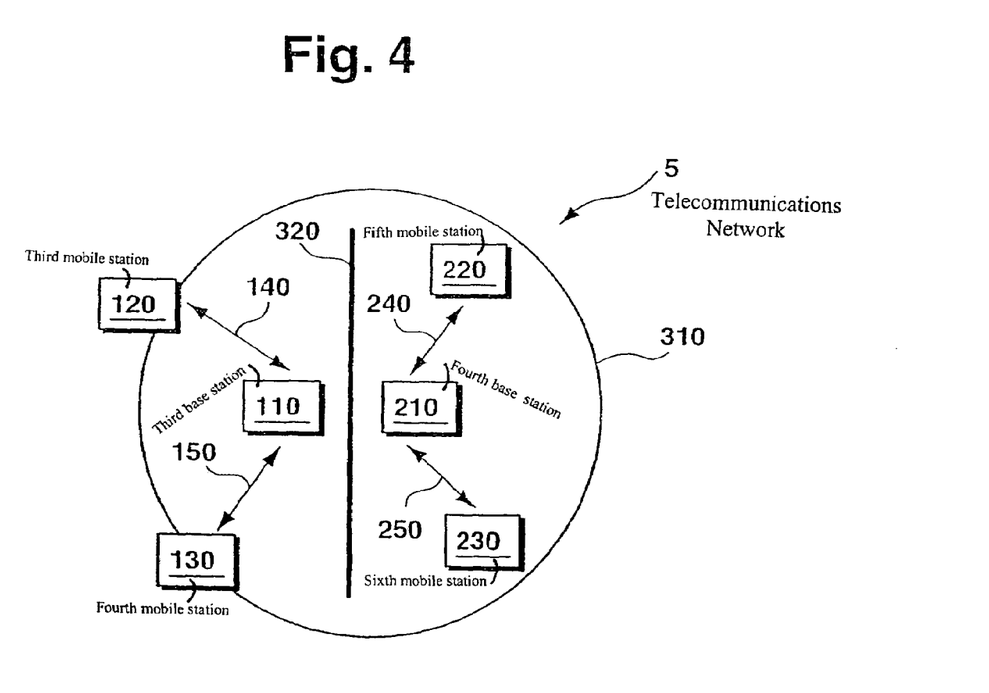
FIG. 4 is a diagram showing an exemplary second arrangement of base and mobile stations in a mobile radio network according to the present invention.
Figure 5:
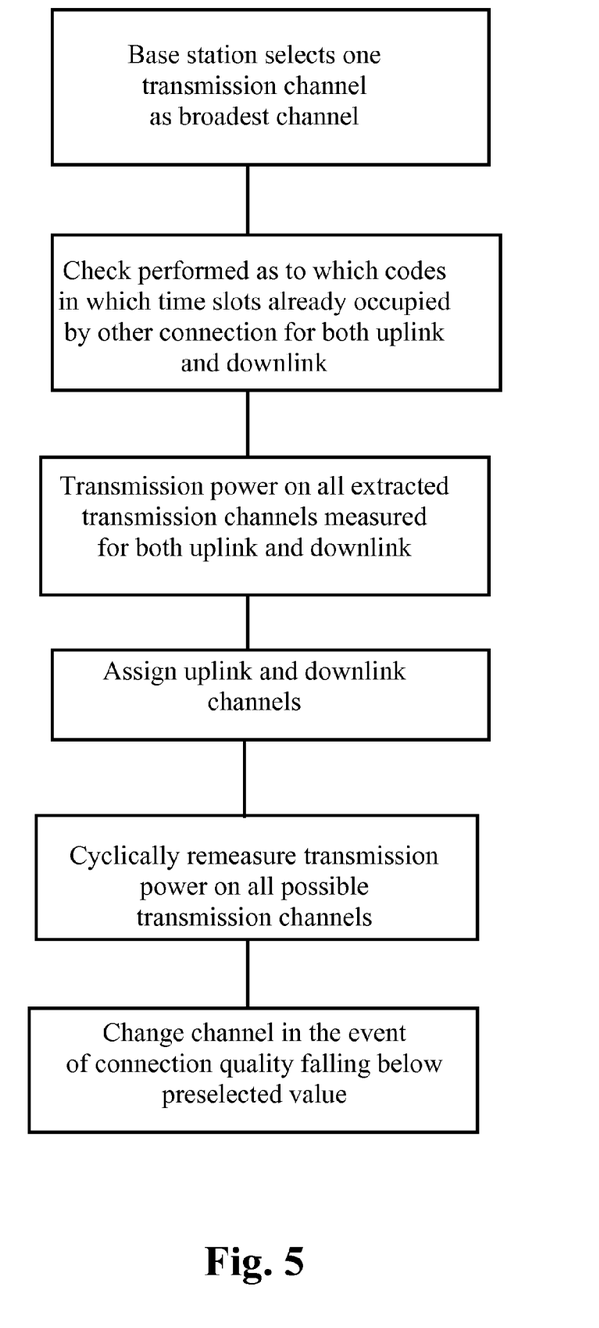
FIG. 5 shows a schematic block diagram (flowchart) of an exemplary method according to the present invention.

Another exemplary embodiment according to the present invention is described with reference to FIG. 4. In this case, 310 identifies a radio coverage area, for example, a shared radio cell, in which a third base station 110 and a fourth base station 210 are operated independently and uncoordinatedly from one another. In this exemplary embodiment, TDD operation using a CDMA method is described for exemplary purposes. Telecommunications network 5 may be implemented as a mobile radio network or as a cordless telephone network.

Third base station 110 and fourth base station 210 are locally positioned directly adjacent to one another and only separated from one another by a wall 320, which does not, however, represent an obstruction for the radio frequencies used for transmission, but rather indicates that both base stations 110, 210 are, for example, positioned in neighboring office rooms. Third base station 110 supplies a third mobile station 120 via a third connection 140 and a fourth mobile station 130 via a fourth connection 150. Third connection 140 and fourth connection 150 may represent radio connections in the TDD mode. In an exemplary scenario, third connection 140 and fourth connection 150 together may require a data rate so high that all of the transmission channels of the TDD mode available are used. Fourth base station 210 then wishes to establish a fifth connection 240 to a fifth mobile station 220 in the TDD mode using the CDMA method. For this purpose, as in the exemplary embodiment described with reference to FIG. 3, all transmission channels available in radio coverage area 310, i.e., code/time slot combinations, are checked as to whether they are already occupied or have interference, which causes them to fall below the preselected value for connection quality. If so, the corresponding transmission channel is unusable. If not, it is usable. Fourth base station 210 recognizes whether all transmission channels in radio coverage area 310 are unusable and/or whether the number of the usable transmission channels still available for fifth connection 240 is smaller than the number of transmission channels necessary for fifth connection 240.

To permit fifth connection 240 to be established without producing unacceptable interference for already existing third connection 140 and already existing fourth connection 150, fourth base station 210 changes a scrambling code used jointly with third base station 110.

One single scrambling code is used within a radio cell. All signals transmitted in the radio cell are scrambled using this scrambling code. To prevent signals of different neighboring radio cells from mutually interfering with one another, for example, if CDMA is used, the signals are scrambled using different scrambling codes, i.e., neighboring radio cells use different scrambling codes. The various scrambling codes are selected so that they have the smallest possible cross correlation with one another for any desired mutual time shifts. The spreading of the signals within a radio cell is then performed using orthogonal codes, which are mutually uncorrelated due to the synchronous transmission.

In another scenario, this concept is abandoned in the case of insufficient transmission capacity, in that in radio coverage area 310, which is to represent a shared radio cell, a scrambling code is introduced for fourth base station 210 which is different from the scrambling code of third base station 110.

Subsequently, the search for and possible assignment of sufficient interference-free transmission channels for fifth connection 240 to be established are repeated in the way described above with reference to FIGS. 1 to 3, but using the new scrambling code.

This procedure is repeated until a sufficient number of sufficiently interference-free transmission channels have been found and assigned to fifth connection 240.

If enough sufficiently interference-free transmission channels are not found, a further scrambling code may be checked in the way described above and used if necessary. This procedure may be repeated until an "unused" scrambling code having enough sufficiently interference-free transmission channels is found.

On the basis of the scenario described above, a sixth connection 250 may be established in the TDD mode using the CDMA method from fourth base station 210 to a sixth mobile station 230, as described with reference to FIG. 4. In another exemplary scenario, fifth connection 240 requires a data rate so high that insufficient transmission channels are available for sixth connection 250, even with scrambling using the new scrambling code because, for example, all transmission channels having the new scrambling code are used by fifth connection 240. The new scrambling code is referred to below as the first new scrambling code.

For sixth connection 250, fourth base station 210 may now introduce a second new scrambling code, which differs from the first new scrambling code and the original scrambling code used, for example, by fourth base station 210, all scrambling codes used having the characteristic of low mutual cross correlation for any desired mutual time shift.

The search for and possible assignment of sufficient interference-free transmission channels for sixth connection 240 to be established are then performed again in the way described above with respect to FIGS. 1 to 3, but using the second new scrambling code.

This procedure is also repeated until a sufficient number of sufficiently interference-free transmission channels is found and assigned to sixth connection 240.

If enough sufficiently interference-free transmission channels are not found, a further scrambling code may be checked and used in the way described above. This procedure may be repeated until an "unused" scrambling code having enough sufficiently interference-free transmission channels is found.

For a connection to be established between one of base stations 110, 210 and one of mobile stations 120, 130, 220, 230, various scrambling codes may be used if the data rate necessary for this connection and the available sufficiently interference-free transmission channels require it.

Therefore, if the connection quality of all or many transmission channels is, for example, worsening due to interference from the uncoordinated operation described above, the influence of interference may be reduced by substituting other scrambling codes.

In this case, the use of different scrambling codes may lead to the transmission capacity of locally delimited telecommunications network 5 in uncoordinated operation being many times greater than that in coordinated operation.

The search for previously unused scrambling codes may either be performed according to a fixed sequence or by random selection of a scrambling code.

Third base station 110, fourth base station 210, third mobile station 120, fourth mobile station 130, fifth mobile station 220, and sixth mobile station 230 are each to have the construction and the mode of operation described for user station 15 shown in FIG. 1. Simultaneously, channel measurement arrangement 10 may produce the new scrambling code(s) and perform appropriate scrambling of the transmission channels to be measured The measurement and assignment of transmission channels scrambled, and therefore also the change of the scrambling code, may be performed both in base stations 11, 12, 110, 210, for example, for the uplink transmission direction, and in mobile stations 21, 22, 120, 130, 220, 230, for example, for the downlink transmission direction.

The search for new scrambling codes may be performed permanently or as needed.

What is claimed is:

1. A method of assigning transmission channels in a telecommunications network having a plurality of base stations and a plurality of mobile stations, the transmission channels being provided for transmitting signals between the plurality of base stations and the plurality of mobile stations, the method comprising:

in an uncoordinated operation of the base stations for establishing a connection between one of the base stations and one of the mobile stations, assigning an uplink and a downlink transmission channel for the transmission of signals between the one of the base stations and the one of the mobile stations;

wherein said one of the base stations and said one of the mobile stations each perform a channel measurement on all possible transmission channels to determine whether such transmission channels are below a pre-selected value for connection quality and said uplink and downlink transmission channels are assigned based on said measurement, and thereafter said one of the base stations and said one of the mobile stations repeatedly re-measure all of the possible transmission channels not previously used to determine whether such transmission channels are below a pre-selected value for connection quality;

wherein the channel measurement on all possible transmission channels is performed prior to the assigning of the uplink channel and the downlink channel, and wherein the mobile station performs the channel measurement for channel transmissions in the downlink direction and the base station performs the channel measurement for channel transmissions in the uplink direction with independent assignment of the uplink channel and the downlink channel.

2. The method according to claim 1, further comprising use of codes to spread at least one transmission resource into a plurality of the transmission channels, wherein the channel measurement includes a code measurement, in which a received signal for each transmission resource is despread using allowed ones of the codes to measure the transmission power in each of the transmission channels.

3. The method according to claim 2, wherein the codes are provided for spreading at least one of a time slot and a frequency band.

4. The method according to claim 1, wherein a connection quality of the existing connection is measured in parallel, and, if the connection quality falls below a preselected value, a channel change is performed and at least one new transmission channel is assigned as a function of a channel measurement of the existing connection.

5. The method according to claim 1, wherein at least one of the base stations transmits specific information via a broadcast channel to all of the mobile stations within a reception range of the at least one of the base stations, and the broadcast channel is changed if an interference detected on the broadcast channel exceeds a preselected value.

6. The method according to claim 5, wherein at least one of the transmission channels is reserved for use as the broadcast channel.

7. The method according to claim 1, wherein the following steps are performed if a transmission capacity of the transmission channels established for assignment is not sufficient:
   (A) scrambling at least one of the transmission channels with a new scrambling code; and
   (B) assigning the at least one scrambled transmission channel for transmitting signals between one of the base stations and one of the mobile stations as a function of a channel measurement, wherein a transmission power on all possible ones of the transmission channels is measured after scrambling the at least one transmission channel, if a transmission power measured on the at least one transmission channel is minimal.

* * * * *

UNITED STATES PATENT AND TRADEMARK OFFICE
CERTIFICATE OF CORRECTION

PATENT NO. : 7,551,932 B2  
APPLICATION NO. : 10/705523  
DATED : June 23, 2009  
INVENTOR(S) : Martin Hans et al.

Page 1 of 1

It is certified that error appears in the above-identified patent and that said Letters Patent is hereby corrected as shown below:

On the Title Page, after Item (65) please insert Items (63) and (30):

--Related U.S. Application Data (63) Continuation of application No. 10/377,443 filed on February 28, 2003 now abandoned, which is a Continuation of application 10/148,854 now abandoned, filed as application No. PCT/DE00/03912 filed on November 9, 2000.

(30) Foreign Application Priority Data

Dec. 1, 1999 (DE)..............................199 57 740.4  
Feb. 25, 2000 (DE)............................100 08 838.4--

Signed and Sealed this
Eighteenth Day of June, 2013

Teresa Stanek Rea
*Acting Director of the United States Patent and Trademark Office*